United States Patent
Triplett (10) Patent No.: US 9,668,461 B1
(45) Date of Patent: Jun. 6, 2017

(54) SKIMMER ASSEMBLY FOR PONDS AND WATER FEATURES

(71) Applicant: Eric Triplett, Yucaipa, CA (US)

(72) Inventor: Eric Triplett, Yucaipa, CA (US)

(73) Assignee: The Pond Digger, Inc., Yucaipa, CA (US)

( * ) Notice: Subject to any disclaimer, the term of this patent is extended or adjusted under 35 U.S.C. 154(b) by 21 days.

(21) Appl. No.: 13/919,950

(22) Filed: Jun. 17, 2013

Related U.S. Application Data (60) Provisional application No. 61/660,513, filed on Jun. 15, 2012.

(51) Int. Cl.
*A01K 63/04* (2006.01)

(52) U.S. Cl.
CPC .................................. *A01K 63/045* (2013.01)

(58) Field of Classification Search
CPC ............................. A01K 63/04; E04H 4/1272
USPC .............. 210/167.21, 167.1, 167.12, 167.19; 119/259
See application file for complete search history.

(56) References Cited

U.S. PATENT DOCUMENTS

| | | | | |
|---|---|---|---|---|
| 3,428,178 A * | 2/1969 | Nash | ............................. | 210/121 |
| 4,126,925 A * | 11/1978 | Jacuzzi | ................. | E04H 4/1272 210/167.1 |
| 4,212,740 A * | 7/1980 | Greene | ................... | 210/167.12 |
| 4,325,150 A * | 4/1982 | Buddy | .................. | E04H 4/1272 137/578 |
| 4,389,739 A * | 6/1983 | Baker | .................... | E04H 4/1227 210/105 |
| 4,879,772 A * | 11/1989 | Meloney, Jr. | ......... | E04H 4/1272 210/167.1 |
| 5,143,605 A * | 9/1992 | Masciarelli | ................ | 210/167.1 |
| 5,584,991 A * | 12/1996 | Wittstock et al. | ............ | 210/151 |
| 7,300,576 B1* | 11/2007 | Blake | .................... | E04H 4/1272 210/167.1 |
| 2003/0196941 A1* | 10/2003 | Danner | ........................ | 210/169 |
| 2010/0230336 A1* | 9/2010 | Davies | ................. | E04H 4/1272 210/167.2 |

FOREIGN PATENT DOCUMENTS

EP 2224077 A1 * 9/2010

* cited by examiner

*Primary Examiner* — Fred Prince
(74) *Attorney, Agent, or Firm* — Knobbe Martens Olson & Bear, LLP (57) ABSTRACT

An easy to install and fish safe skimmer assembly for ponds and other water features is provided. The skimmer assembly includes a skimmer housing having an upper portion and a lower portion. The upper portion is substantially open and in fluid communication with the water feature in a manner such that fish in the water feature can swim in and out of the upper portion of the skimmer housing without being trapped by a physical barrier. The lower portion is enclosed and is in fluid communication with a conduit for transporting filtered water back into the water feature. The skimmer assembly further includes a barrier that separates water within the skimmer, a debris collector, and a floating weir disposed in the debris collector and moves in a vertical direction relative to the skimmer housing when a suction force is applied to force water to flow through the skimmer housing.

15 Claims, 8 Drawing Sheets

SKIMMER ASSEMBLY FOR PONDS AND WATER FEATURES

INCORPORATION BY REFERENCE TO ANY PRIORITY APPLICATIONS

Any and all applications for which a foreign or domestic priority claim is identified in the Application Data Sheet as filed with the present application, including U.S. Provisional Patent Application Ser. No. 61/660,513 filed Jun. 15, 2012, titled "Pond Skimmer," are hereby incorporated by reference under 37 CFR 1.57.

BACKGROUND OF THE INVENTION

Field of the Invention

The invention generally relates to filtering devices for water features such as ponds, water gardens, and other bodies of standing water.

Description of the Related Art

Outdoor water features such as man-made ponds and other bodies of standing water have become very popular. Many of these water features contain live plants, and living creatures such as koi fish, and are often surrounded by other natural growths such as trees, bushes, grass, and other assorted plants. As a consequence, fallen leaves, grass, twigs, organic wastes, and other debris often end up in the pond and need to be removed.

Skimmers have been used to remove floating debris from ponds and other man-made water features. However, the currently available skimmers have drawbacks. In particular, pond skimmers often use a door mechanism to regulate the flow of water into the skimmer. The door mechanism prevents water inside the skimmer from flowing back out. However, the door mechanism can also trap fish swimming around the skimmer. If a fish inadvertently swims through skimmer door, the door becomes a physical barrier that prevents the fish from leaving the skimmer housing. Thus, there is a need for a pond water filtration system that is not potentially hazardous to fish and other living creatures. At the same time, the system should be robust and versatile to accommodate the various needs of pond owners.

SUMMARY OF THE INVENTION

In various embodiments, an easy to install and fish safe skimmer assembly for a pond and other water features is provided. In one embodiment, the skimmer assembly includes a skimmer housing having an upper portion and a lower portion. The upper portion is substantially open and in fluid communication with the water feature in a manner such that fish in the water feature can swim in and out of the upper portion of the skimmer housing without being trapped by a physical barrier. The lower portion is enclosed and in fluid communication with a conduit for transporting filtered water back into the water feature.

The skimmer assembly further includes a barrier, a debris collector and a floating weir. The barrier may be a plate that separates at least some of the water in the upper portion from at least some of the water in the lower portion. The debris collector may be a basket that extends downwardly from the barrier into the lower portion of the skimmer housing and configured to retain at least some of the debris floating on water entering the skimmer housing through the upper portion. In some embodiments, the debris collector is removably attached to the barrier. The floating weir may be disposed in the debris collector and move up and down in a vertical direction relative to the skimmer housing. The floating weir can be made of a material with buoyance greater than water. Alternatively, the floating weir can be constructed with cavities that reduce the density of the weir, thereby increasing its buoyancy in water. In some embodiments, the upper portion of the skimmer housing has a greater cross-section area than that of the lower portion. In some embodiments, the skimmer assembly further includes a pump that is disposed at least partially within the lower portion and is configured to provide a suction force that directs water from the upper portion through the floating weir and debris collector down into the lower portion. In some embodiments, an air gap is formed between the barrier and the water surface in the lower portion. The air gap advantageously allows the barrier to sealingly engage with the skimmer housing. The floating weir, moving in a vertical direction, prevents fish from entering the debris collector but does not block off the path for fish to swim away from the skimmer upper opening. The skimmer assembly can be used with koi ponds, ornamental ponds, or water gardens, particularly those with koi fish or the like.

In one implementation, the barrier forces most of the unfiltered water through the floating weir and into the debris collector in a substantially helical pattern. The barrier may be a plate positioned generally horizontal, resting on a shelf near the upper portion of the housing, and be disposed just below the mouth of the skimmer opening. A suction force from the lower portion of the skimmer housing draws water into the housing through the mouth of the skimmer opening. Air may be draw down through the weir as well as water, which may create a physical air gap between the plate and the pre-filtered water column.

The housing may be designed such that a submersible pump may be installed below the barrier, debris collector, and floating weir. The suction force created by the submersible pump, or by an external pump in communication with the skimmer housing, helps created the air gap. The air gap may help seal the barrier, such as plate, to the skimmer housing, reducing the amount of water that could bypass the debris collector and floating weir. As the unfiltered water passes through the floating weir and through the debris collector, it becomes pre-filtered water as pond debris is trapped in the debris collector and is not allowed to progress through the skimmer housing.

DETAILED DESCRIPTION OF THE PREFERRED EMBODIMENT

The preferred embodiments of the present disclosure provide a skimmer assembly that is designed to be substantially free of a trap zone for fish and that can be easily installed and maintained. The skimmer assembly may be used in relation to a pond, water garden, or other such body of water. The skimmer assembly may be positioned adjacent a koi pond and oriented substantially vertically with a wide top opening that is in fluid communication with the pond. The skimmer assembly may be anchored in the ground adjacent to the water in the pond or otherwise hidden from view. The wide top opening of the skimmer assembly may also be concealed from view by a using temporary structure, which may be removed for accessing the skimmer for cleaning or maintenance.

Figure 1:
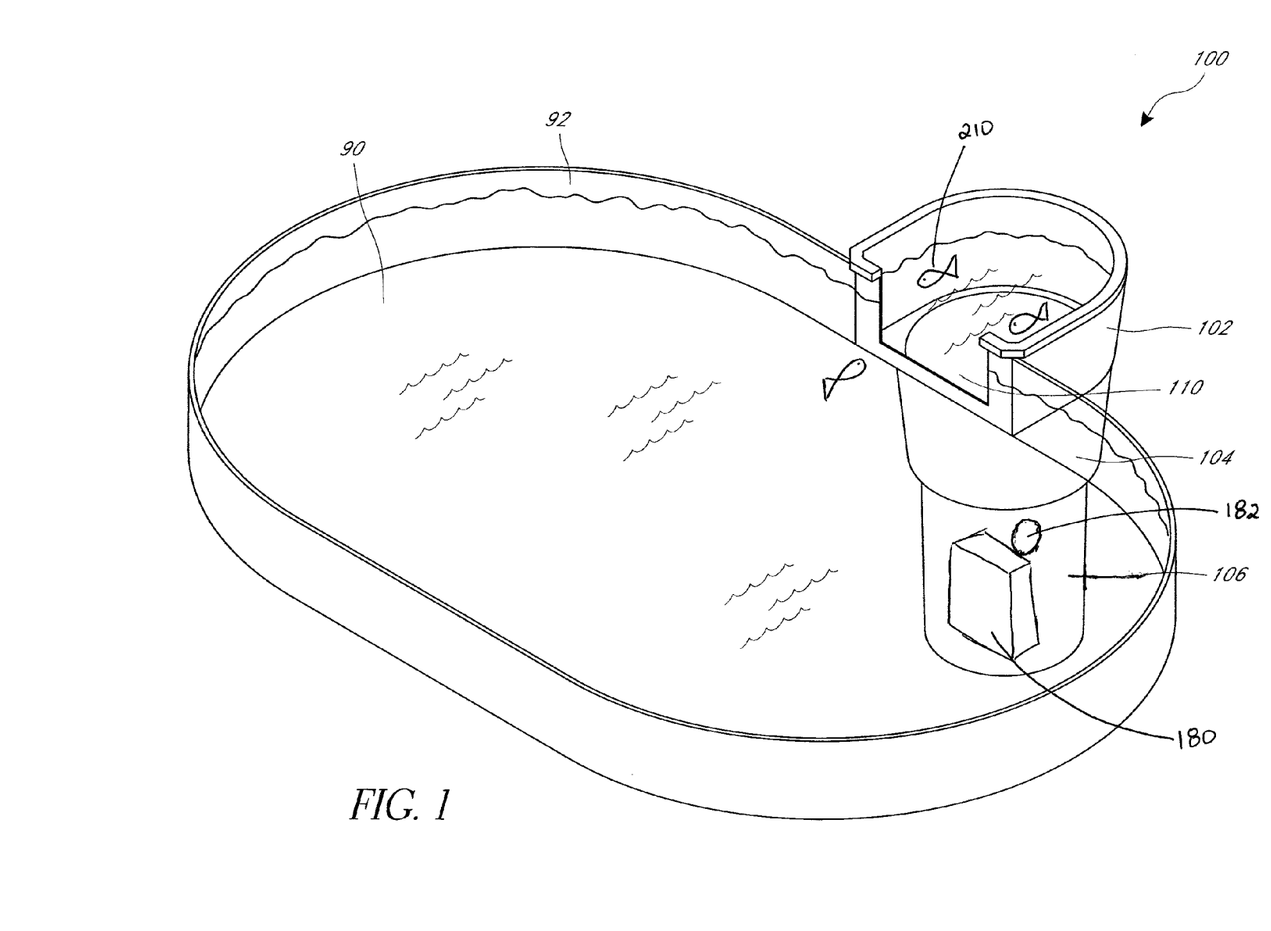
FIG. 1 is a top perspective view of a skimmer in relation to a body of water.

FIG. 1 shows a skimmer assembly 100 according to one embodiment. The skimmer assembly 100 may comprise an open upper portion 102, an intermediate portion 104, and a lower portion 106, each portion having a different cross sectional area. The upper portion 102 of the skimmer assembly may include a wide opening 110 configured to receive water flowing from a pond 90. In one embodiment, the opening 110 may be generally rectangular in shape. In other embodiments, the upper portion 102 may also comprises an automatic refill valve 103 and an overflow valve 105. Additionally, many ponds, water gardens, and other bodies of water 90 contain a liner 92 in order to prevent excess water loss. Some liners 92 are made of plastic, rubber, or other sheet-like material. The opening 110 in the upper portion 102 of the skimmer 100 may be configured to accept part of the liner 92 in order to prevent water from escaping at the interface between the liner 92 and the upper portion 102. The liner 92 may be bolted, glued, or otherwise permanently or temporarily attached to part of the upper portion 102, and may be attached to the perimeter of the opening 110.

In some embodiments, the cross sectional area of the upper portion 102 is greater than the cross sectional area of the intermediate portion 104, which in turn is greater than the cross sectional area of the lower portion 106. Other embodiments of the skimmer housing may comprise just the upper portion 102 and the lower portion 106, with the cross-sectional area of the upper portion 102 being greater than the cross sectional area of the lower portion 106. The reduction in cross sectional area from the upper portion 102 to the lower portion 106 facilitates using suction force generated by a pump to force water to flow downwardly through the skimmer assembly and improves the flow pattern of the water.

As further shown in FIG. 1, a pump 180, such as a submersible pump, may be located in the lower portion 106 of the skimmer assembly 100. The pump can be used to draw water into the skimmer assembly 100. The output of the pump may be directed to a second location in the pond 90 via an opening 182 drilled in the back wall of the lower portion 106. When in use, the water from the pond 90 flows into the open upper portion 102 of the skimmer assembly 100. Since many ponds 90 contain koi or other fish 210, it is advantageous to utilize a skimmer system that does not trap or otherwise harm the fish. Other skimmer systems may use doors or pump systems that run the risk of trapping the fish in an area, or up against a filter intake. The skimmer assembly 100 substantially eliminates these risks by creating a structure that is substantially free of a trap zone for fish. Additionally, the skimmer assembly 100 uses few moving parts and is easily cleaned. Finally, if a pump is located in the skimmer assembly 100, it may be located in the lower portion of the skimmer assembly 106, which is often located beneath the surface of the ground, buffering the sounds created by the pumping machinery.

Figure 2A:
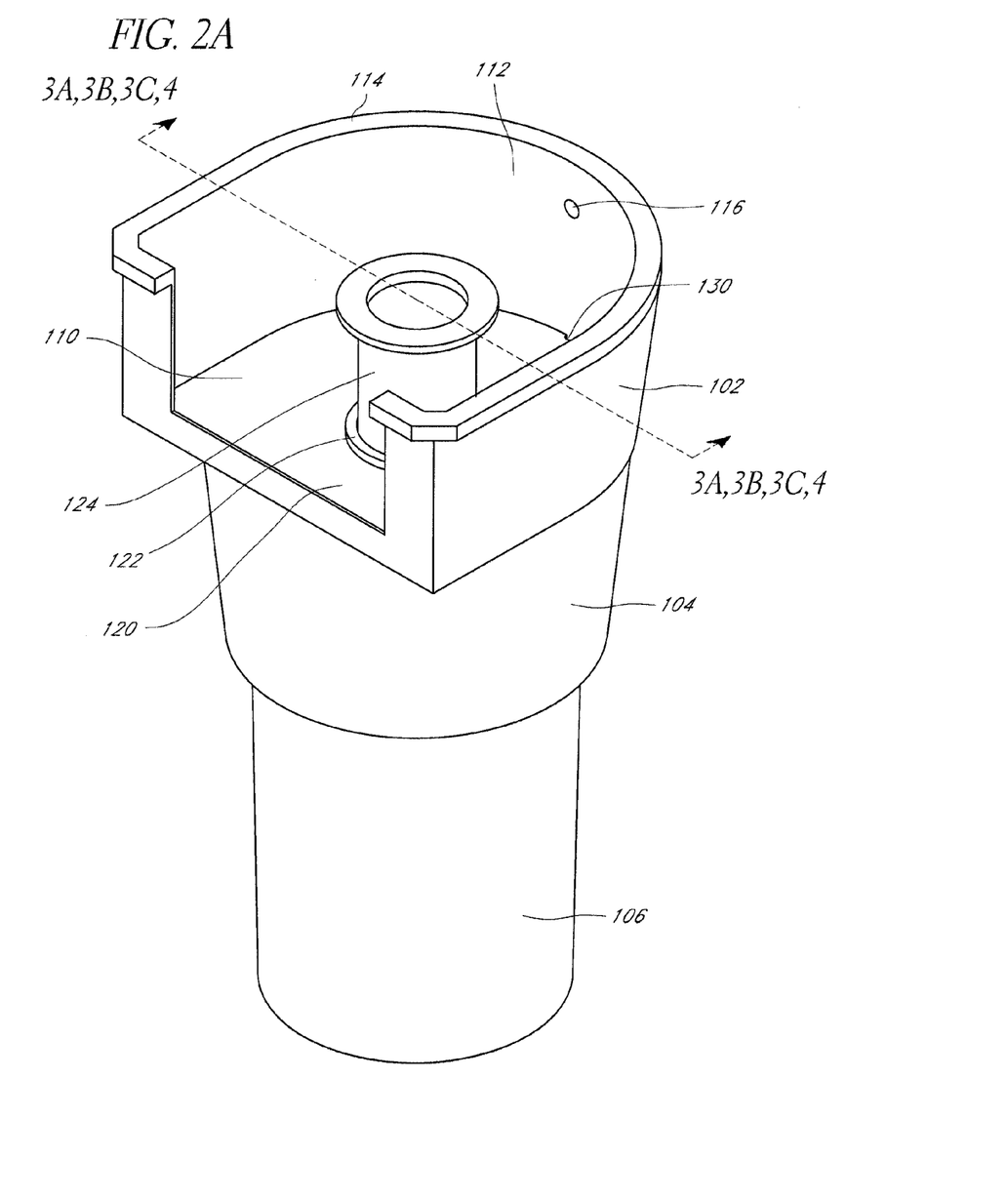
FIG. 2A is top perspective view of a skimmer.

FIG. 2A shows a perspective view of the skimmer assembly 100. The opening 110 in the upper portion 102 of the skimmer assembly 100 is defined by a wall 112 extending along at least a portion of the periphery of the upper portion 102. The wall 112 may have a curved configuration so as to form a generally U shaped enclosure for receiving surface water from the pond. The upper portion 102 may or may not contain a cover. The wall 112 may contain a lip 114 extending laterally outward from the wall 112. Among other reasons, the lip 114 may make it easier to grip the skimmer assembly 100 during installation, or may provide more rigidity to the unit in general. In one embodiment, the wall 112 of the upper portion contains one or more holes 116 for electrical cords to pass through. Electrical cords or other objects may be passed through the hole 116 and then a plug may be inserted to the hole 116 in order to substantially prevent water from exiting the upper portion 102 through the hole 116. The upper portion 102 may contain other features such as overflow valve or automatic refill. Other features may be installed before or after the user installs the skimmer assembly 100 next to the body of water. The wall 112 of the upper portion 102 may be generally vertical and portions may be cylindrical or frustoconical shaped. The bottom of the upper portion 102 comprises an opening that communicates with the intermediate portion 104 and/or the lower portion 106.

In one embodiment the intermediate portion 104 is completely enclosed by a wall 112. The intermediate portion 104 communicates with both the upper portion 102 and the lower portion 106. The intermediate portion 104 is generally round and may be generally cylindrical or frustoconical shaped. In one embodiment, the lower portion 106 comprises walls 112 on all sides and has a solid, generally flat bottom. The top of the lower portion 106 communicates with the intermediate portion 104 and/or the upper portion 102. The lower portion 106 is generally round and may be generally cylindrical or frustoconical shaped. However, one or more walls defining the lower portion 106 may comprise a generally flat profile. A flat profile may be advantageous to a user because this would allow them to customize the skimmer 100 and create holes where he likes. In one embodiment the back of the lower portion 106 has a flat section 184 through which a user can drill a hole that can be used to direct the water output of the pump. Other embodiments may include a lower section 106 that has a plurality of smaller generally flat sections along the bottom of the lower section 106 or other locations in the bottom section 106. This configuration may be helpful because a user is not required to put a hole in any particular position and may customize the skimmer 100 to the requirements of the application. The lower portion 106 may house a pump, or may be connected to an external pump (not shown in FIG. 2A).

The upper 102, intermediate 104, and lower 106 portions may be made of plastic, metal, rubber, or other durable material. The thickness of the portions may range from approximately 1/10 of an inch to several inches thick. In one embodiment the thickness of part of the upper 102, intermediate 104, and lower 106 portions may be approximately 1/4 inches thick. However, the thickness of the upper 102, intermediate 104, and lower 106 portions may vary depending on the material used for construction, the location on the skimmer assembly 100 where the measurement is taken, the specific application of the skimmer assembly 100, the application of various stress concentrations, and other factors. The upper 102, intermediate 104, and lower 106 portions need not be made of the same material, nor must they have the same wall thickness. The upper 102, intermediate 104, and lower 106 portions may be made by typical manufacturing methods including injection molding, casting, machining, etc. The upper 102, intermediate 104, and lower 106 portions may be made as a single unit or may be produced as separate pieces and later assembled.

Figure 2B:
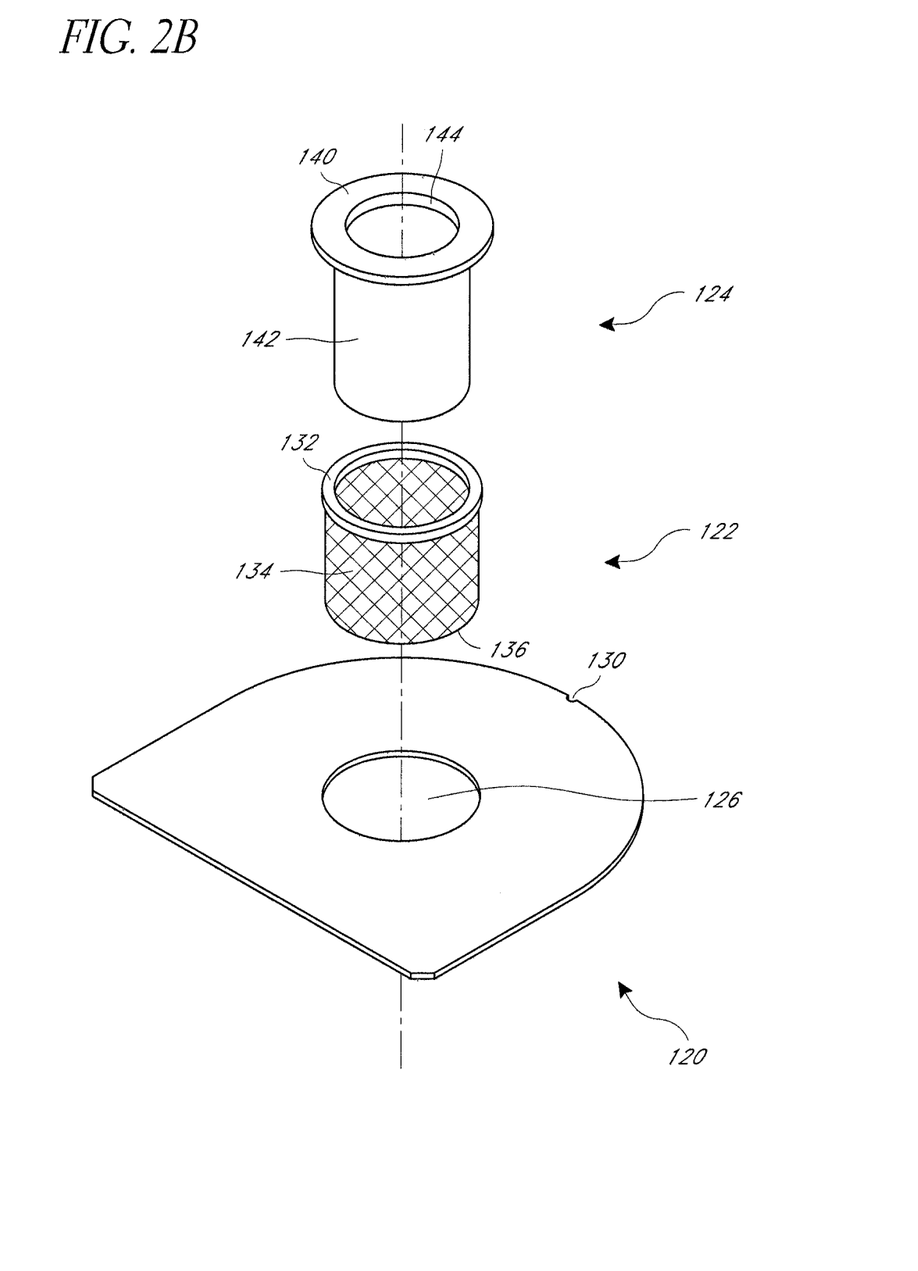
FIG. 2B is an exploded perspective view of a plate, a basket, and a weir.
Figure 3A:
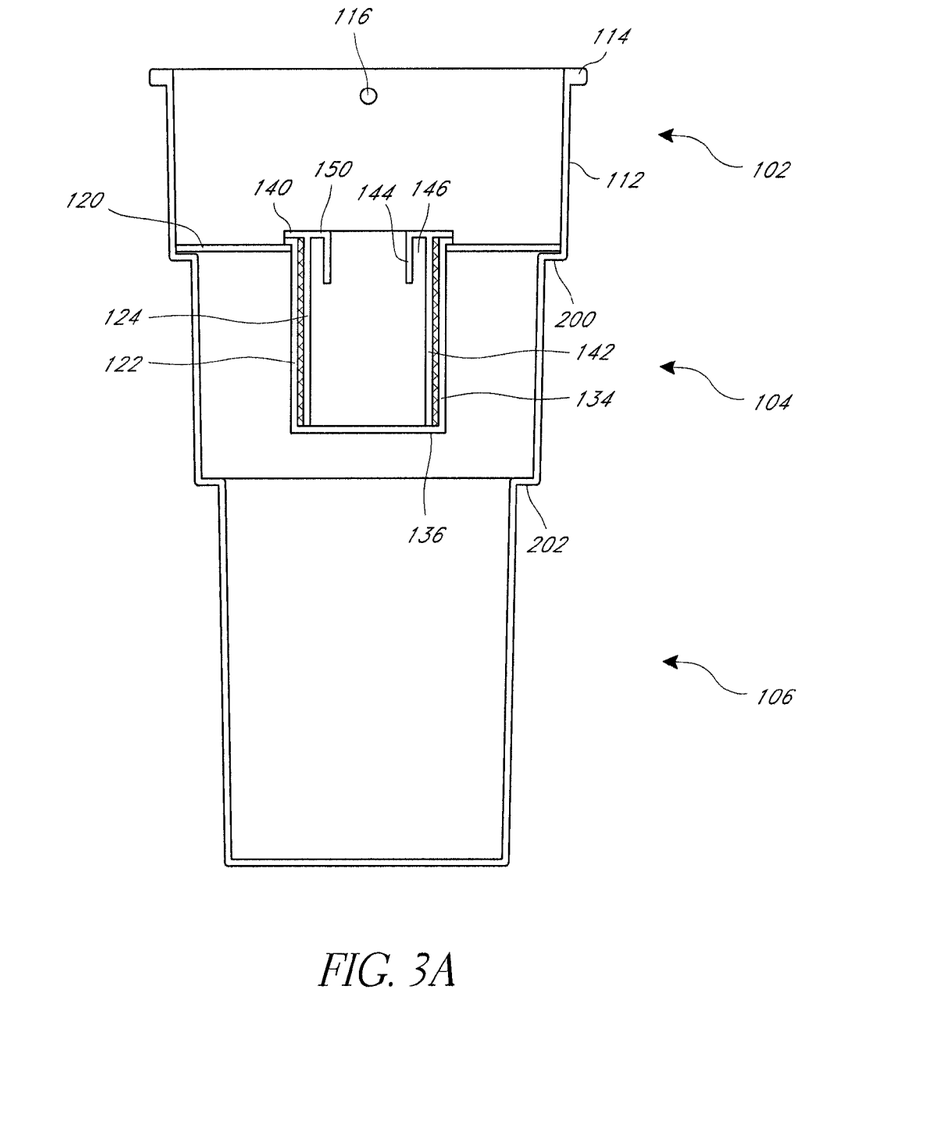
FIG. 3A is a front cross-sectional view of a skimmer including a plate, a basket, and a weir.
Figure 3B:
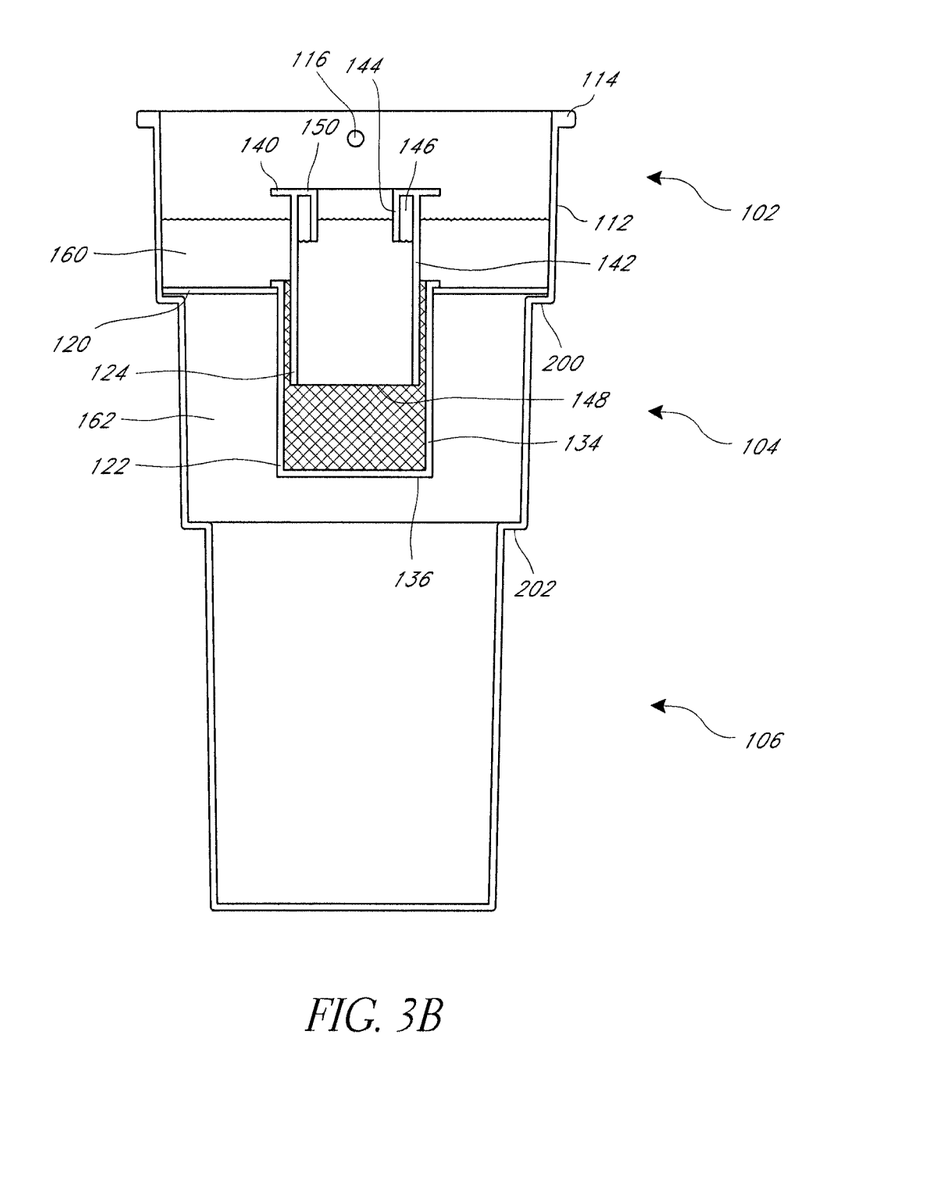
FIG. 3B is a front cross-sectional view of a skimmer including a plate, a basket, and a weir.

As also shown in FIGS. 2A and 2B, a plate 120, a debris collector in the form of a basket 122, and a floating weir 124 may be disposed in the skimmer assembly 100. The plate 120 may be one or more pieces and may contain an opening 126, in which the basket 122 may sit. The plate 120 may act as a separator that separates unfiltered water 160 in the upper portion 102 of the skimmer assembly 100 from pre-filtered water 162 in the intermediate portion 104 of the skimmer assembly 100 as shown in FIG. 3B. At least part of the floating weir 124 may be disposed within at least part of the debris basket 122. The floating weir 124 may move freely in a vertical direction within the debris basket 122, and may be able to rotate about a vertical axis. Additionally, the floating weir 124 may be able to move some amount in a side to side direction, or rotate some amount about a horizontal axis.

FIG. 2B shows an exploded view of the plate 120, the basket 122, and the floating weir 124, which may be disposed in the skimmer assembly 100 in parts of the upper 102 or intermediate 104 portions. As shown in FIG. 3A, the plate 120 may be supported in the skimmer assembly 100 by a first shelf 200 disposed between the upper 102 and intermediate 104 portions. The plate 120 may have a rounded back and a generally flat front and sides. The shape of the plate 120 may mimic the shape of the upper portion 102. The plate 120 may have a notch 130 in the back to accommodate an electrical cord or other object. In one embodiment an electrical cord may be run from a pump in the lower portion 106 up through the notch 130 in the plate 120 and through the hole 116 in the back of the upper portion 102. The plate 120 may contain a generally circular hole 126 which may accommodate a basket 122 and/or floating weir 124. In one embodiment the hole 126 in the plate 120 is between 3 and 20 inches in diameter. In another embodiment, the hole 126 in the plate 120 is between 6 and 16 inches in diameter. In yet another embodiment, the hole 126 in the plate 120 is approximately 10 to 12 inches in diameter. The thickness of the plate 120 may be approximately ½ inches thick and generally uniform throughout, however, other thicknesses and thickness distributions may work.

As shown in FIG. 2B, the top of the basket 122 may have a lip 132 that extends radially outward from at least part of the top of the basket 122. The outer diameter of the lip 132 may be larger than the diameter of the hole 126 in the plate 120, such that the basket 122 may be inserted into the hole 126 of the plate 120 but not be able to pass completely through. The basket 122 has a generally cylindrical or frustoconical shape with substantially vertical walls 134. The outer diameter of the walls 134 may be less than the diameter of the hole 126 in the plate 120. The walls 134 can be made from a screen or mesh or other filtering structure. The bottom 136 is generally flat and can also be made from a screen or mesh or other filtering structure. The top of the basket 122 may be open to accept at least part of the floating weir 124. In one embodiment the basket 122 is between 4 and 20 inches high from end to end. In another embodiment the basket 122 is approximately 12 inches high from end to end. In one embodiment the outside diameter of the basket lip 132 is between 3 and 20 inches. In another embodiment the outside diameter of the basket lip 132 is approximately 12 inches. The thickness of the walls 134 may be between ¹/₁₀ inches and 2 inches, or may be approximately ¼ inches.

The size of any holes in the walls 134 may depend on the application and the size of the debris that is desired to be removed.

The top of the floating weir 124 may have a lip 140 that extends radially outward from at least part of the top of the weir 124. The outer diameter of the weir lip 140 may be larger than the inner diameter of the basket 122. The weir 124 has a generally cylindrical or frustoconical shape with substantially vertical outer walls 142. The outer diameter of the outer walls 142 may be less than the inner diameter of the basket 122, such that at least part of the weir 124 may be disposed within at least part of the basket 122. When the floating weir 124 is disposed within the basket 122, the weir lip 140 may contact the basket lip 132, preventing the floating weir 124 from being further inserted within the basket 122. Additionally, the weir lip 140 may also help to keep any pond fish further away from the top surface 150 of the floating weir 124, further reducing the chances that a pond fish could get trapped in the container. The top of the floating weir 124 is generally open. The floating weir 124 may contain a feature which makes it buoyant relative to water. In one embodiment an inner wall 144 extends from the top surface 150 of the floating weir 124 down towards the bottom of the weir 148, creating a cavity 146 between the inner wall 144 and outer wall 142 for at least part of its height. In another embodiment, this cavity 146 is sealed off, such that the cavity 146 is substantially or completely air-tight. In yet another embodiment the floating weir 124 comprises a material that has a density less than water such that the floating weir 124 becomes buoyant. In still another embodiment, a buoyant material (e.g., foam, balloon, rubber bladder) is attached to some part of the floating weir 124 to make it buoyant in water. Various methods may be utilized in order to position the floating weir 124 at the proper height relative to the water's surface 152. The walls 142, 144, and top surface 150 of the floating weir 124 may be between ¹/₁₀ and several inches thick, or may be approximately ¼ inches thick.

The plate 120, debris basket 122, and weir 124 may be made from plastic, metal, or any other suitable material. The parts may be made of the same material, but need not be made from the same materials. The plate 120, debris basket 122, and floating weir 124 may be made by typical manufacturing methods including injection molding, casting, machining, etc. Each piece may be manufactured as a single piece or may be made in several parts and later assembled.

FIG. 3A shows a front elevational cross-section of the skimmer 100, including the plate 120, basket 122, and floating weir 124. The skimmer 100 may contain a first shelf 200 or other mechanism disposed between the upper 102 and intermediate 104 portions of the skimmer 100, to support a plate 120 or other object. In one embodiment, the plate 120 is disposed on a first shelf 200 in a substantially horizontal orientation, with the basket 122 disposed within the hole 126 of the plate 120. The basket 122 may be supported by the basket lip 132 resting on a portion of the plate 120. The floating weir 124 may be positioned such that at least part of the floating weir 124 is disposed within at least part of the basket 122. In one embodiment, when there is no water in the system, the weir lip 140 rests on a portion of the basket 122, which may include the basket lip 132. In another embodiment, when there is no water in the system, the bottom of the weir 148 rests on the bottom of the basket 136 and may elevate the lip of the weir 140 above the top surface of both the basket 122 and the plate 120. In yet another embodiment, the floating weir 124 may be suspended above at least part of the basket 122 and/or the plate 120 using another mechanism.

When water enters the skimmer assembly 100, in one embodiment, the floating weir 124 becomes elevated above the top surface of the basket 132 and/or the surface of the plate 120, as shown in FIG. 3B. If the floating weir 124 is configured to be buoyant relative to water, the floating weir 124 may naturally float, maintaining a substantially consistent position relative to the surface of the water 152. In one embodiment, the floating weir 124 has an inner wall 144 that extends down from the top surface of the weir 150 creating a cavity 146 in the interior of the weir 124. When water is added to the system, the air becomes trapped in the cavity 146 and makes the floating weir 124 relatively buoyant. In this embodiment, the height of the inner wall 144 and the radial distance between the inner wall 144 and outer wall 142 may affect the buoyancy of the floating weir 124. The buoyancy of the weir 124 may be adjusted using the methods described earlier. The distance between the outer wall of the floating weir 142 and the basket lip 132 may be such that some water can pass between the two parts without a significant amount of water being able pass between the two parts. The more water that passes between the basket 122 and the floating weir 124 means that less water passes through the center of the floating weir 124.

Figure 3C:
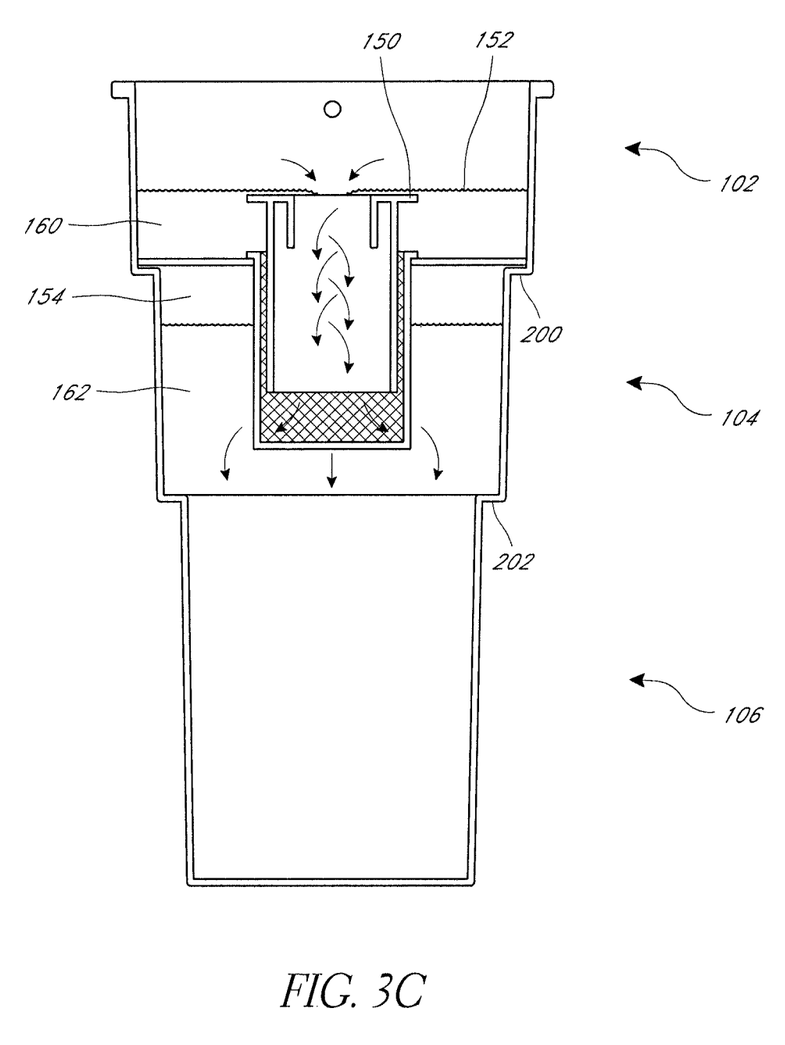
FIG. 3C is a front cross-sectional view of a skimmer including a plate, a basket, and a weir.

When a suction force is created in the intermediate 104 or lower 106 portion (from a pump or connection to a pump), the floating weir 124 may be pulled at least partially down relative to the surface of the water 152, as shown in FIG. 3C. In one embodiment, when a suction force is applied, the top surface of the weir 150 descends below the surface of the water 152, which then allows the water to flow over the top surface of the weir 150, down through the interior of the weir 124, and into the basket 122 and intermediate portion 104 of the skimmer 100. The height of the surface of the water 152 above the top surface of the weir 150 may be between ¼ inches and several inches, or may be between 1 and 2 inches. The height of the water surface 152 above the weir 124 may depend on several factors and may vary depending on the application. However, with all other variables remaining constant, if the water level 152 in the pond 90 decreases (and therefore the water level 152 in the upper portion 102 of the skimmer 100 decreases), the height of the surface of the water 152 above the top surface of the weir 150 may remain substantially consistent. If the height of the surface of the water 152, and the height of the weir top surface 150 in relation to the plate 120 both decrease, the flow rate of the water through the weir 124 may remain substantially consistent. In one embodiment, due to the increased speed of the water flowing from the upper portion of the skimmer assembly 102, and focusing on the interior of the floating weir 124, the water flowing through the floating weir 124 may form a helix or vortex pattern. At the same time, some air may get sucked down with the water traveling into the floating weir 124. The helical pattern of the water flowing through the floating weir 124 may have advantages such as better aeration of the water, which may be beneficial to fish and other creatures living in the water body. The air then exits the bottom of the floating weir 124, travels through the basket 122, and forms an air gap 154 at the top of the intermediate portion 104, just below the plate 120. The air gap 154 may help the plate 120 seal against the first shelf 200 as there is water pushing down on the plate 120 but only air pushing up on the plate 120. After the water and debris flows through the interior of the floating weir 124, the water flows through the basket 122 while the debris may become trapped by the debris basket 122. Due to the increased velocity of the water and debris traveling through the floating weir 124, much of the debris may become lodged toward the bottom of the basket 122. This allows more debris to be collected by the basket 122 before the system becomes less effective. To empty the basket 122 of the collected debris, one may turn off the suction force, reach into the skimmer 100 and remove the weir 124 and basket 122. The basket 122 may then be emptied and returned to the skimmer 100 along with the weir 124.

Figure 4A:
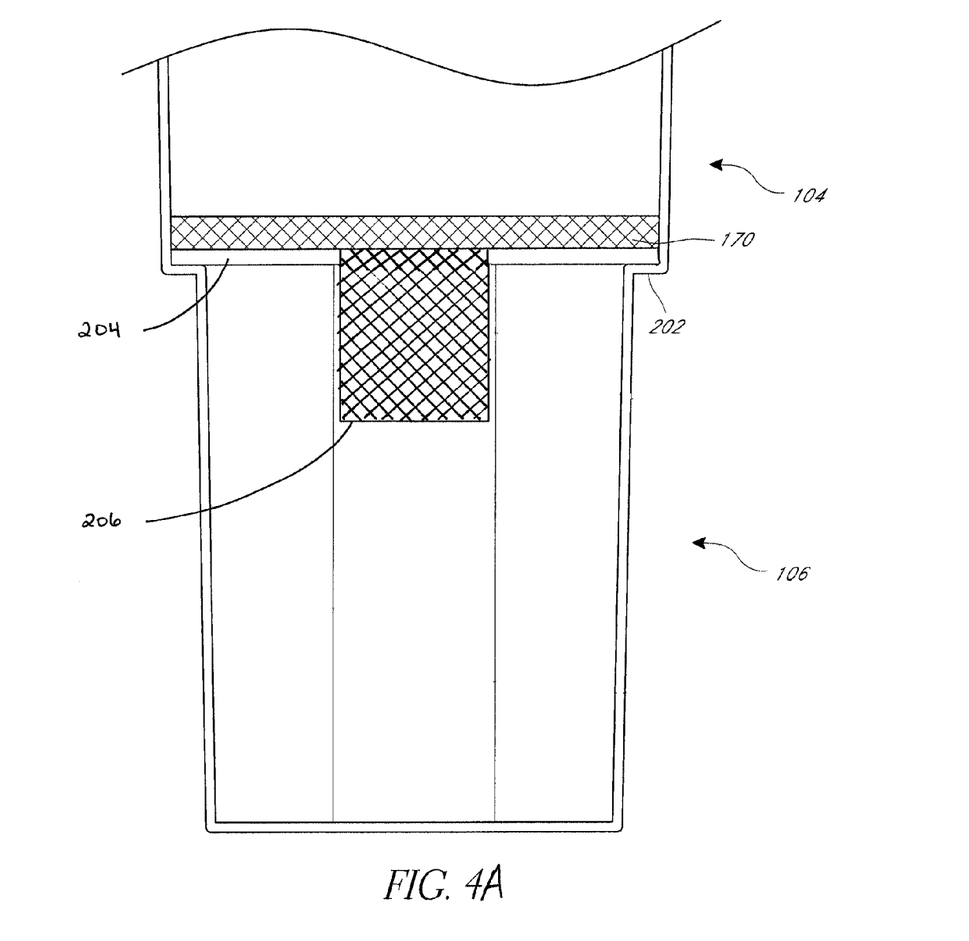
FIG. 4A is a front cross-sectional view of a skimmer including a layer and a second basket.

After the unfiltered water 160 flows through the basket 122 and debris becomes trapped, the unfiltered water 160 becomes pre-filtered water 162, which may flow through the intermediate portion 104, as shown in FIG. 4A. A second shelf 202 or other supporting mechanism may be disposed between the intermediate 104 and lower 106 portions of the skimmer 100. A layer 170 may be positioned on the second shelf 202 such that after the pre-filtered water 162 flows through the intermediate portion 104 it then flows through the layer 170 and into the lower portion 106.

The layer 170 may serve a variety of purposes or may be omitted completely. In one embodiment the layer 170 is a coarse or fine filter that removes debris that is not collected by the basket 122. In this embodiment, the large debris, such as leaves and sticks, may be retained by the basket 122, while the coarse or fine filter may remove smaller particles like dirt or silt. It may be advantageous for the skimmer assembly 100 to filter out some smaller particles before the water is transmitted by a pump. In another embodiment, the layer 170 may be used filter out dissolved impurities in the water. In this embodiment, the layer 170 may comprise activated charcoal that can absorb impurities as they pass from the intermediate portion 104 to the lower portion 106 of the skimmer assembly 100. In yet another embodiment, the layer 170 may add substances to the water as it passes through the layer 170. In this embodiment, the layer 170 may help to control the acidity, hardness, or salinity of the water. In still yet another embodiment, the layer 170 may be used to help control other chemical or biological aspects of the water system. Any included layer 170 may also comprise other chemical compounds such as zeolite or oyster shells. Or, depending on the application and desired characteristics of the water body, the layer 170 may be omitted completely with the water passing from the intermediate portion 104 to the lower portion 106 without passing through a second filter. The layer 170 may be very thin or may be several inches thick, depending on the application. After the water passes through any layer 170, the water is then transmitted to the lower portion 106, which may contain a pump.

In another embodiment, shown in FIG. 4A, a second plate 204 may be disposed on the second shelf 202, above or below any included layer 170. Similar to plate 120, a second plate 204 may serve to separate pre-filtered water 162 from chemically filtered water (not shown). The second plate 204 may support a second basket 206 similar to basket 122. The second basket 206 may be disposed within a hole (not shown) in the second plate 204, similar to how the basket 122 may be disposed within a hole 126 of the plate 120. The second basket 206 may be generally cylindrical in shape, or may comprise another shape. In one embodiment the second basket 206 is approximately the same size and shape as the basket 122. The second basket 206 may serve any of the functions of the layer 170 by adding particles to the pre-filtered water 162 or removing particles from the pre-filtered water 162. Water that passes from the intermediate portion 104 to the lower portion 106 through the second basket 206 may be labeled chemically filtered water. The chemically filtered water may then be communicated via a pump, or may go through another process.

Figure 4B:
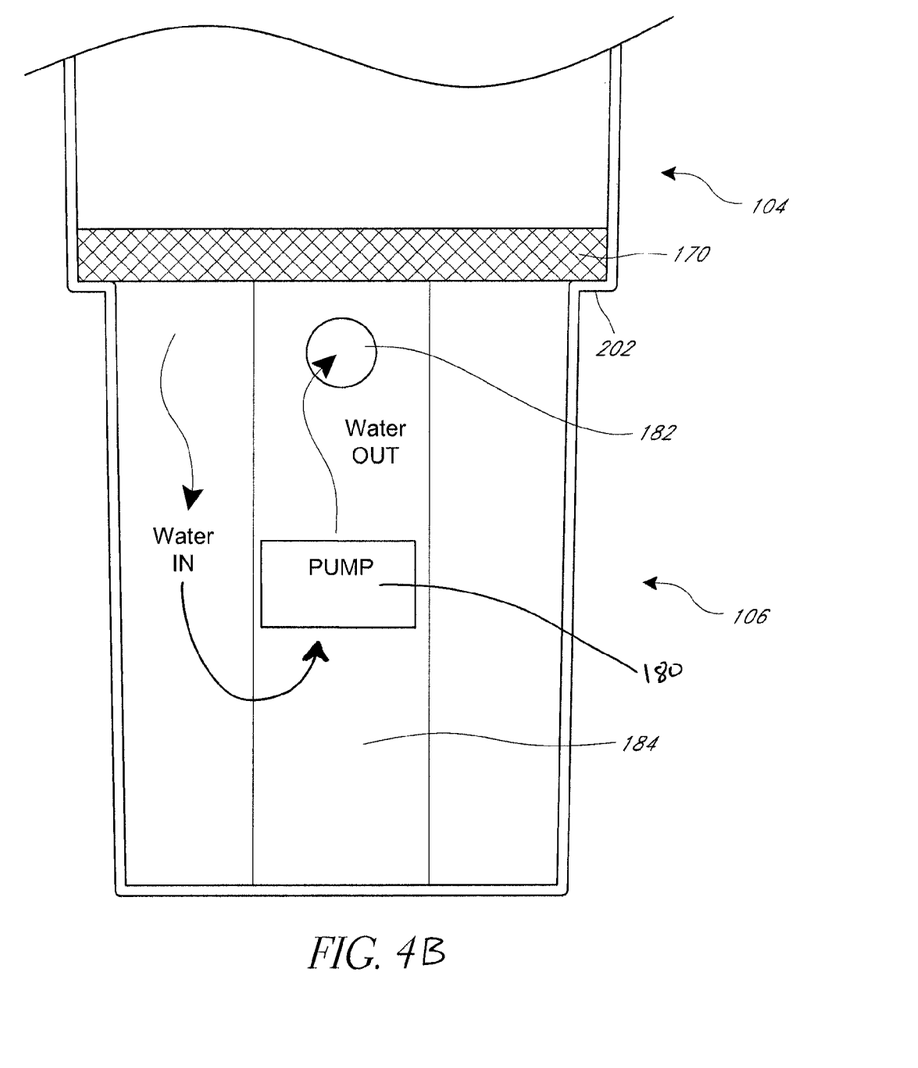
FIG. 4B is a front cross-sectional view of a skimmer including a layer and a pump.

In one embodiment, shown in FIG. 4B, the lower portion 106 contains a pump 180, which can create a suction force used to drive the water flow in the skimming assembly. The pump 180 may be submersible and may comprise any pump that is suitable for the application. The pump 180 may be permanently or temporarily affixed to the skimmer assembly 100. In one embodiment the pump 180 is powered by an electrical cord that is disposed within the skimmer 100 and within a notch 130 in the plate, and exit the skimmer 100 through a hole 116 in the back of the upper portion 102. Or, the electrical cord may connect the pump 180 to an outside power source through any other route that is suitable. The water output of the pump 180 may be transmitted out of the skimmer assembly through a hole in the side of the skimmer assembly. In one embodiment, a hole 182 has been formed in a flat section of the lower portion 106 of the skimmer assembly 100. The pump output may be routed through the hole 182 through standard water transmission means. In another embodiment, the pump output may be routed through a hole in another part of the skimmer assembly. In yet another embodiment, the pump output is routed back up through the skimmer and exit through the top of the upper portion of the skimmer assembly 102. In still yet another embodiment, a pump is located external to the skimmer assembly 100 and water is transmitted out of the skimmer 100 through any of the described routes before it is processed by a pump. The output of the pump may ultimately be deposited back into the body of water 90 from which the water originally came. In one embodiment the water is deposited back to the water body 90 on substantially or at least partially on a different side of the water body in order to maximize the flow characteristics and debris removal of the water body 90. In another embodiment, the skimmer assembly 100 can be used to retrofit an existing pond or other water feature. The method of retrofitting includes connecting the skimmer assembly 100 to an existing pump line. The method can also include drilling appropriate openings in the planar section of the wall of the skimmer housing and fitting one or more bulkheads through such openings for connection with existing components.

Any features of the embodiments shown and/or described in the figures that have not been expressly described in this text, such as distances, proportions of components, etc. are also intended to form part of this disclosure. Additionally, although this invention has been disclosed in the context of various embodiments, features, aspects, and examples, it will be understood by those skilled in the art that the present invention extends beyond the specifically disclosed embodiments to other alternative embodiments and/or uses of the invention and obvious modifications and equivalents thereof. Accordingly, it should be understood that various features and aspects of the disclosed embodiments can be combined with, or substituted for, one another in order to perform varying modes of the disclosed inventions. Moreover, any component or combination of components disclosed herein can be used in other structures or configurations of containers. Thus, it is intended that the scope of the present invention herein disclosed should not be limited by the particular disclosed embodiments described above.

What is claimed is:

1. A skimmer assembly for a water feature comprising:
    a skimmer housing having an upper portion and a lower portion, said upper portion comprising an upper skimmer housing wall that is substantially open on top and on a side forming a continuous opening from a top of said skimmer housing to a side of said skimmer housing, the continuous opening being sized in a manner such that fish in the water feature can swim in and out of the upper portion of the skimmer housing without being trapped by a physical barrier, said lower portion is enclosed by a lower skimmer housing wall and in fluid communication with a conduit for transporting filtered water back into the water feature;
    a barrier extending radially inward from an inner surface of said upper skimmer housing wall and an inner surface of said lower skimmer housing wall, said barrier separates at least some of the water in the upper portion from at least some of the water in the lower portion;
    a debris collector comprising a lip at a top of the debris collector, said lip in contact with said barrier to prevent said debris collector from completely entering said lower portion, said debris collector extending downwardly from the barrier into the lower portion of the skimmer housing, wherein the debris collector retains at least some of the debris in water entering the skimmer housing through the upper portion; and
    a floating weir, said floating weir is disposed in the debris collector and moves in a vertical direction relative to the skimmer housing.

2. The skimmer assembly of claim 1, wherein the upper portion of the skimmer housing has a greater cross sectional area than that of the lower portion.

3. The skimmer assembly of claim 1, wherein the barrier comprises a separation plate positioned substantially horizontally in the upper portion of the skimmer housing.

4. The skimmer assembly of claim 1 further comprising a pump, wherein the pump is disposed at least partially within the lower portion and is configured to provide a suction force that directs water from the first portion through the floating weir and debris collector.

5. The skimmer assembly of claim 4, wherein an air gap is formed in the lower portion between the barrier and the water surface in the lower portion, said air gap being formed by the suction force from the pump.

6. The skimmer assembly of claim 1, wherein the water feature is a pond.

7. A filtration device for a pond comprising:
    a housing forming an upper portion, an intermediate portion, and a lower portion, said housing having upper and side openings configured to be positioned at about the surface level of the pond, wherein the upper and side openings receive surface water from the pond;
    a separator positioned between the upper portion and the intermediate portion, a filter, a layer positioned between the intermediate portion and the lower portion, a floating weir, and a pump positioned in a vertical arrangement inside the housing; and
    wherein the pump creates a suction force that directs at least some of the surface water in the upper portion to flow through the floating weir, wherein the floating weir prevents fish from swimming into the filter without trapping the fish, and
    wherein the filter is configured to remove debris from the water and the layer is configured to remove particles relatively smaller than the debris after the water passes through the filter.

8. The filtration device of claim 7, wherein the filter is a debris basket configured to retain biological debris.

9. The filtration device of claim 7, wherein the pump is a submersible pump disposed within the housing.

10. The filtration device of claim 9, wherein the pump is further disposed below the separator, layer, filter, and floating weir.

11. The filtration device of claim 7, wherein the filter is supported by the separator; and wherein the separator is supported by a first shelf formed by the housing.

12. The pond filtration device of claim 7, wherein the water flowing through the floating weir flows in a substantially helical pattern.

13. The pond filtration device of claim 7, wherein at least part of the floating weir is generally cylindrical shaped and comprises a top surface.

14. The pond filtration device of claim 13, wherein the water flowing through the floating weir flows over the top of the floating weir; and wherein the surface of the pond is between ½ inches and 2 inches above the top surface of the floating weir.

15. The pond filtration device of claim 7, wherein a change in the vertical positioning of the floating weir does not substantially affect the flow rate of water through the floating weir.

* * * * *